United States Patent
Pei et al.

(10) Patent No.: US 10,508,037 B2
(45) Date of Patent: Dec. 17, 2019

(54) METHOD FOR CONTINUOUSLY PREPARING GRAPHENE OXIDE NANOPLATELET

(71) Applicant: Institute of Metal Research Chinese Academy of Sciences, Shenyang, Liaoning Province (CN)

(72) Inventors: Songfeng Pei, Shenyang (CN); Wencai Ren, Shenyang (CN); Huiming Cheng, Shenyang (CN)

(*) Notice: Subject to any disclaimer, the term of this patent is extended or adjusted under 35 U.S.C. 154(b) by 0 days.

(21) Appl. No.: 16/087,922

(22) PCT Filed: Mar. 22, 2017

(86) PCT No.: PCT/CN2017/077610
§ 371 (c)(1),
(2) Date: Sep. 24, 2018

(87) PCT Pub. No.: WO2017/162155
PCT Pub. Date: Sep. 28, 2017

(65) Prior Publication Data
US 2019/0112195 A1    Apr. 18, 2019

(30) Foreign Application Priority Data
Mar. 22, 2016  (CN) .......................... 2016 1 0167450

(51) Int. Cl.
*C01B 32/192* (2017.01)
*C01B 32/205* (2017.01)
(Continued)

(52) U.S. Cl.
CPC .......... *C01B 32/192* (2017.08); *C01B 32/198* (2017.08); *C01B 32/205* (2017.08);
(Continued)

(58) Field of Classification Search
CPC ... C01B 32/192; C01B 32/198; C01B 32/205; C01B 32/23; C01B 32/225; B82Y 30/00; B82Y 40/00
See application file for complete search history.

(56) References Cited

FOREIGN PATENT DOCUMENTS

| CN | 102544530 A | 7/2012 |
| CN | 105271205 A | 1/2016 |

OTHER PUBLICATIONS

Parvez, Khaled, et al. "One-step electrochemical synthesis of nitrogen and sulfur co-doped, high-quality graphene oxide." Chemical Communications 52.33 (2016): 5714-5717.*

* cited by examiner

*Primary Examiner* — Richard M Rump
(74) *Attorney, Agent, or Firm* — Novoclaims Patent Services LLC; Mei Lin Wong

(57) ABSTRACT

Provided is a method for continuously preparing graphene oxide nanoplatelets by electrochemical treatment, comprising using a continuous graphite product, successively processing two step treatments, i.e. an electrochemical intercalation and an electrolytic oxidation stripping. The electrochemical intercalation is carried out in a concentrated acid, using a graphite material as an anode and energizing under a soaking condition such that acid radical ions enter into graphite interlamination under the drive of an electric field, to form an intercalated graphite continuous material with first-order or low-order intercalation. The electrolytic stripping is using the intercalated continuous graphite material as an anode, energizing in an aqueous electrolyte solution, and performing oxidation stripping. The method has the following advantages: a product does not contain a metal impurity, the oxidation degree of graphene is controllable, the process is continuable and automatable, and the method is safe and has low emissions, etc.

12 Claims, 4 Drawing Sheets

(51) Int. Cl.
  *C01B 32/23* (2017.01)
  *C01B 32/198* (2017.01)
  *C01B 32/225* (2017.01)
  *B82Y 30/00* (2011.01)
  *B82Y 40/00* (2011.01)
(52) U.S. Cl.
  CPC ............ *C01B 32/225* (2017.08); *C01B 32/23* (2017.08); *B82Y 30/00* (2013.01); *B82Y 40/00* (2013.01)

METHOD FOR CONTINUOUSLY PREPARING GRAPHENE OXIDE NANOPLATELET

BACKGROUND OF THE PRESENT INVENTION

Field of Invention

The present invention relates to graphene preparation technology, and more particularly to a method of continuously preparing graphene oxide nanoplatelet based on electrochemical treatment.

Description of Related Arts

Graphene oxide is an important functional derivative of graphene and is a key material in graphene applications. Structurally, graphene oxide is grafted with a large number of oxygen-containing functional groups such as hydroxyl groups, epoxy groups, carbonyl groups, carboxyl groups, etc. on the two-dimensional carbon plane of graphene. The presence of these functional groups converts the surface of graphene from inert to active hydrophilic surfaces and other polar solvents. Most of the functionalization processes of graphene start with graphene oxide. Therefore, graphene oxide is the basic material for researches and applications in graphene chemistry. In terms of application, it is widely used in many new technical fields such as mechanically reinforced polymer-based composites, ion filtration, high barrier films, catalyst loading, drug delivery and sustained release, supercapacitors and etc. due to its characteristics of easy dispersion, easy film formation and easy functionalization.

At present, the relatively mature preparation method of graphene oxide is usually carried out in a concentrated sulfuric acid environment. By using a strong composite oxidizing agent, strong oxidation treatment of graphite flakes or powder materials is carried out. Graphite oxide is then obtained and then exfoliated to obtain graphene oxide. One of the most typical and widely used methods is still the Hummers method which is proposed in 1958, that is, composite oxidant composed of fuming sulfuric acid, sodium nitrate and potassium permanganate is used for graphite treatment. The problems of this method include: (1) the reaction heat release is large and the reaction needs to be carried out under low temperature conditions, (2) large consumption of sulfuric acid: on average, the treatment of 1 kg of graphite requires about 50 kg of concentrated sulfuric acid and about 5 tons of mixed waste acid solution is formed and is non-recyclable, thus causing huge environmental pollution and greatly increasing manufacturing costs, and (3) heavy metal ions manganese are introduced into the product, thus limiting its use in many applications. The Chinese invention patent application (Publication No.: CN104310385A) discloses a rapid and environmental friendly method for preparing a single-layer graphene oxide, that is, the graphite is treated by using ferrate as an oxidizing agent to prepare graphene oxide, and the oxidation of graphite can be quickly realized at normal temperature. This method is currently recognized as a new method superior to the Hummers method for the preparation of graphene oxide. (L. Peng et al., An iron-based green approach to 1-h production of single-layer graphene oxide, 'Nature Communications', 2015, Vol. 6, pp. 5716-5724). However, there are also problems of high consumption of acid and impurity introduction of metal ions into the product.

Electrochemical intercalation of graphite to prepare graphene and graphene oxide has a long history of research. This type of method uses an external power supply to increase the potential of the graphite and charge it. Under the action of the electric field, electrolyte ions in solution state enter graphite layers and the electrochemical reaction of electrolyte ions between graphite interlayers are used to exfoliate the graphite to prepare graphene. This type of method does not require the use of strong chemical oxidants while the exfoliation and oxidation process of graphite can be controlled by current or voltage control of electrochemical reactions, so it is considered as a relatively green preparation method of graphene and graphene oxide.

The Chinese invention patent application (Publication No.: CN 102807213A and CN 102534642A), each discloses a method for electrochemically preparing graphene. Academic journal, 'Carbon' (C. T. J. Low et al., Electrochemical approaches to the production of graphene flakes and their potential applications, 'Carbon', 2013, vol. 54, pp. 1-21) summarizes the research progress before 2013 in preparation of graphene and graphene oxide by electrochemical exfoliation. Academic journal, 'RSC Advances' (J. Liu et al., A green approach to the synthesis of high-quality graphene oxide flakes via electrochemical exfoliation of pencil core, 'RSC Advances', 2013, vol. 3, pp. 11745-11750) discloses a method for preparing graphene oxide flakes via electrochemical exfoliation of pencil core in an aqueous solution of phosphoric acid or sulfuric acid. Academic journal, 'Journal of American Chemical Society' (K. Parvez et al., Exfoliation of graphite into graphene in aqueous solutions of inorganic salts, 'Journal of American Chemical Society', 2014, vol. 136, pp. 6083-6091) discloses a method for preparing graphene nanoplatelet via electrochemical exfoliation of graphite foil in a dilute aqueous solution of a salt such as sodium sulfate and ammonium sulfate. Academic journal 'Small' (L. Wu et al., Powder, Paper and Foam of Few-Layer Graphene Prepared in High Yield by Electrochemical Intercalation Exfoliation of Expanded Graphite, 2014, 'Small', vol. 10, pp. 1421-1429) discloses a method for preparing graphene nanoplatelet via pressing electrode by electrolytic expanded graphite in a medium concentration aqueous solution of sulfuric acid.

In the above patents and reports, all of the disclosed processing methods have a common feature. That is, the process is carried out in the same electrolytic cell to intercalate and exfoliate graphite to prepare graphene. One key requirement for preparing graphene by electrochemical exfoliation of graphite is to ensure that a graphite sheet layer can maintain good electrical contact with the power supply electrode before the graphite sheet layer is exfoliated to graphene nanoplatelet. That is, the graphite sheet layer is always charged and has the same potential as the power supply electrode so as to ensure the process of electrochemical reaction. The basic process of the prior art usually involves immersing the graphite electrode in the same solution containing the intercalating substance, connecting the power and carrying out exfoliation and intercalation at the same time to from graphene or graphene nanoplatelet. The decomposition voltage of water under standard conditions is only 1.23V, and in the presence of a large amount of electrolyte, the required overpotential for its decomposition is small. In general, a 1.5V or above is sufficient to produce significant decomposition. Accordingly, in most of the electrochemical intercalation and exfoliation processes which utilize water as the electrolyte solvent, it is not possible to avoid gas generation (hydrogen gas or oxygen gas) by water decomposition on the electrode. The expansion and stripping action of the gas causes most of the graphite particles or graphite thick sheets that have not been effectively intercalated to peel off from the surface of the electrode, causing them to lose electrical contact and fail to be further exfoliated into graphene. Therefore, the existing electrochemical exfoliation methods generally have a problem of low yield and a large ratio of graphite sheets in the product. (C. T. J. Low et al., Electrochemical approaches to the production of graphene flakes and their potential applications, 'Carbon', 2013, vol. 54, pp. 1-21, table 1). Since both the graphite and the graphene nanoplatelet have a quasi-two-dimensional thin-sheet structure, subsequent centrifugal grading is difficult to separate the graphite from the graphene nanoplatelet. Therefore, the product obtained is usually a mixture of graphene and graphite with a wide distribution of layers. This will adversely affect the subsequent application of graphene.

SUMMARY OF THE PRESENT INVENTION

In view of the problems of the existing arts, an object of the present invention is to provide a method of continuously preparing graphene oxide nanoplatelet which comprises a two-step electrochemical intercalation and electrochemical exfoliation process to prepare graphene oxide. When a flexible graphite coil, strip or carbon fiber rod or wire is used as a raw material, continuous and automatic preparation of graphene oxide can be realized while the pollutant emission in the preparation process of graphene oxide is greatly reduced, thereby realizing the high efficiency and low cost preparation of the graphene.

The technical solution of the present invention is:

A method of continuously preparing graphene oxide nanoplatelet, which comprises the steps of: providing a flexible graphite paper coil as a graphite raw material; through driving the raw material by a feeding device, sequentially processing a two-step treatment of electrochemical intercalation and electrolytic oxidation exfoliation respectively; obtaining a graphene oxide nanoplatelet which is dispersed in electrolyte; processing treatment of filtering, washing and drying and then obtaining a graphene oxide powder material.

The method of continuously preparing graphene oxide nanoplatelet, wherein the raw material has a macroscopic continuous structure and is a flexible graphite paper, graphitized carbon fiber, high purity graphite sheet, graphite strip or graphite rod, and the raw material has a carbon content above 95 wt % and a volume conductivity not smaller than 100 S/cm.

The method of continuously preparing graphene oxide nanoplatelet, wherein the process of preparing graphene oxide comprises the steps of: sequentially processing an electrochemical process in two different devices defining a first process and a second process, wherein in the first process, a process of electrochemical intercalation is carried out, wherein in the second process, a process of electrochemical electrolysis for oxidation and exfoliation is carried out; the graphite raw material is first driven by a feeding device and sequentially passes through the two different devices, then the graphene oxide nanoplatelet is formed in the second device; in the two electrochemical processes which are carried out in the two different devices, the graphite raw material are used as anodes and inert electrode materials are used as cathodes respectively, then power is connected to carry out electrochemical reaction.

The method of continuously preparing graphene oxide nanoplatelet, wherein in the process of electrochemical intercalation of the first process, an intercalant is one or a mixture of two or more selected from the group consisting of concentrated sulfuric acid, concentrated nitric acid, chlorosulfonic acid and concentrated phosphoric acid in the liquid phase, and the intercalant has a total water content not higher than 2 wt %; after the process of electrochemical intercalation, a first product is formed and the first product has a shape unchanged and remains in a continuous state while a mechanical and electrical properties are not degraded.

The method of continuously preparing graphene oxide nanoplatelet, wherein in the process of electrochemical intercalation of the first process, a voltage range is 10~1000 V, and preferably 50~150 V, the graphite material has a maintaining time in an intercalated electrode area with a range of 1~200 seconds, and preferably with a range of 5~30 seconds; the feeding device has a transmission speed which is designed or adjusted based on a length of the intercalated electrode area and a duration of the maintaining time, the length of the intercalation electrode area is designed according to a length of an intercalation slot, and a ratio of the length of the intercalation electrode area to the length of the intercalation slot is preferred to be 1:6-2:3; a feed rate of the graphite material ranges from 1 mm/min to 10 m/min, and preferably from 10 mm/min 10 cm/min; the graphite material defined a center, the inert electrodes are placed on one or two side of the graphite material and is level with a surface of the graphite surface; a distance between the inert electrode and the surface of the graphite material ranges from 1 mm to 1 m, and preferably from 5 mm~50 mm.

The method of continuously preparing graphene oxide nanoplatelet, wherein in the process of electrochemical electrolysis for oxidation and exfoliation of the second process, the electrolyte used is an aqueous solution of strong electrolyte acids, bases or salts, which includes but not limited to one or a mixture of two of the group selecting from sulfuric acid, nitric acid, hydrochloric acid, sodium sulfate, potassium sulfate, sodium chloride and amine nitrate, the electrolyte is a solution having a solution conductivity ranged from 100 μS/cm to 1000 S/cm, and preferably from 10 mS/cm~10 S/cm.

The method of continuously preparing graphene oxide nanoplatelet, wherein in the process of electrochemical electrolysis for oxidation and exfoliation of the second process, a voltage range is 10~1000 V, and preferably 50~100V; the intercalated graphite continuous material obtained after the first process is driven by the feeding device to gradually introduce into a region below a surface of the electrolyte solution, and to oxidize and exfoliate to form the graphene oxide nanoplatelet in the region, then the graphene oxide nanoplatelet is peeled off from the intercalated graphite continuous material and dispersed into the electrolyte; a feed rate of the intercalated graphite continuous material into the electrolyte solution ranges from 1 mm/min to 10 m/min, preferably ranges from 10 mm/min~10 cm/min; the intercalated graphite continuous material defined a center, the inert electrode is placed on one or two side of the intercalated graphite continuous material and is level with a surface of the intercalated graphite continuous material; alternately, a centerline of the intercalated graphite continuous material defined a center, the inert electrode is surrounding the intercalated graphite continuous material; a distance between the inert electrode and the surface of the intercalated graphite continuous material ranges from 1 mm to 1 m, preferably from 10 mm~100 mm.

The method of continuously preparing graphene oxide nanoplatelet, wherein an oxidation degree of the graphene oxide nanoplatelet which is exfoliated and dispersed in the electrolyte has a corresponding relation with the voltage used in the electrolysis process, if the voltage increases, the oxidation degree of the graphene oxide nanoplatelet increases, the product has a carbon to oxygen ratio ranging from 1:1 to 10:1, and preferably from 2:1~5:1.

The method of continuously preparing graphene oxide nanoplatelet, a yield-to-weight ratio of graphene to graphite raw material is greater than 90%, and preferably 95%~110%; and a weight ratio of single-layer rate of the graphene oxide product is greater than 50%, and preferably 70%~80%.

The method of continuously preparing graphene oxide nanoplatelet, wherein in the first process, as an amount of graphite increases, an amount of the intercalant in the reaction tank is gradually reduced, and additional intercalant is added to the intercalation slot to maintain a solution level in the reaction tank so that the solution level of the intercalant is maintained within a range of ±2 mm compared to an initial level; in the second process, the graphene oxide dispersed in the liquid phase in the exfoliation slot is collected by filtration, then the filtrate is pumped back into the exfoliation slot for continuous use, and pure water is added to adjust the conductivity of the solution until preferred value.

The principle of the invention is:

The block diagram of a method of continuously preparing graphene oxide by using graphite paper or carbon fiber is illustrated in FIG. 1 of the drawings. Continuous graphite materials are sequentially processed by a two-step treatment of electrochemical intercalation (the first process: Process 1) and electrolytic oxidation exfoliation (the second process: Process 2) so that the graphite is exfoliated to graphene oxide nanoplatelet. The mechanism of the first process and the second process are illustrated in FIGS. 2a and 2b respectively.

Wherein the first process is carried out in concentrated acid such as concentrated sulfuric acid, concentrated nitric acid, concentrated phosphoric acid or chlorosulfonic acid. The graphite material is used as the anode and the inert electrode is used as the cathode. When energized under immersion conditions, acid ions are driven by the electric field to enter the graphite layer to form intercalated graphite continuous material of first-order or low-order intercalation. Since the water content in the concentrated acid is extremely low or no water content is in the concentrated acid, the intercalation process has a spontaneous termination property after complete intercalation, so that the graphite sheet or the carbon fiber is not expanded and exfoliated and no oxidation damage will occur (The Raman spectrum before and after intercalation is shown in FIGS. 5a-b of the drawings). Therefore, good electrical contact, continuity and mechanical strength can be maintained at all times, thereby the electrochemical intercalation reaction can be fully carried out while transport to the next process by mechanical transmission is facilitated. In order to ensure that the intercalation reaction is completely carried out, it is necessary to control the feed rate to allow the graphite material to stay in the intercalation region for an appropriate period of time. Since the concentrated acid adsorbed on the surface or pores of graphite paper by immersion can be extruded by mechanical rolling, the concentrated acid can flow back into the intercalation slot for continuous use.

Electrolytic exfoliation is performed by using the intercalated graphite continuous material as an anode, an inert electrode as a cathode, then connecting power to carry out electrolytic exfoliation in an aqueous electrolyte solution. Since the acid ions between the graphite layers have a strong affinity between the water molecules, when the intercalated graphite material is immersed in the aqueous solution, the water molecules are spontaneously introduced into the graphite layer from the outside to the inside through the displacement. At this moment, the graphite sheet layer corresponds to the microelectrode sheet, and water molecules and hydroxide ions (OH—) entering between the layers are decomposed on the surface of the electrode by electrochemical action to produce oxygen, and the graphite sheet layer is gradually separated by gas expansion. On the other hand, as the electrolysis voltage increases during the electrolysis process, the decomposition of water molecules and OH— will also gradually increase and produce oxygen free radicals (O.) and hydroxyl radicals (HO.) with strong oxidizing properties, and the content of radicals will increase as the electrolysis voltage increases. These free radicals react with the surface of the graphene in the electrochemical oxidation state to form a graft to produce an epoxy or hydroxyl group, thereby causing oxidation of the graphene surface to form graphene oxide. The degree of oxidation of graphene oxide is closely related to the amount of oxidative radical generated in the electrochemical reaction. Therefore, the oxidation degree of the obtained graphene oxide can be adjusted by adjusting the voltage used in the exfoliated process, thereby preparing graphene oxide products with different degrees of oxidation. In this process, the role of the electrolyte in the aqueous solution is mainly to increase the conductivity of the solution, thereby reducing the overpotential of the electrochemical reaction. The electrolyte itself does not participate in the reaction and is not consumed. Therefore, the electrolyte used may be either the same acid as the intercalant or other inert electrolyte salts or bases. In order to ensure the complete oxidation exfoliation reaction, it is necessary to control the feed rate so that the intercalated graphite material is gradually immersed in the exfoliation electrolyte to react, so that the rate of exfoliation consumption of the graphite material is consistent with the replenishment rate of the feeding materials. During the exfoliation process, the intercalant originally inserted between the graphite layers is dissolved in the exfoliation electrolyte, so that the electrolyte concentration in the exfoliation electrolyte is increased, and the conductivity of the solution is increased. In order to ensure the consistency of the exfoliation reaction, addition of some deionized water is required to adjust the conductivity of the solution to the particular set value.

Due to surface oxidation, the graphene oxide obtained after exfoliation is hydrophilic and has good dispersibility in aqueous solution. Therefore, a monodisperse graphene oxide dispersion can be obtained by simple stirring, shaking or ultrasonic stripping. The graphene oxide in the dispersion can be separated from the exfoliation electrolyte by suction filtration and condensation. The separated exfoliation electrolyte can be injected into the electrolytic exfoliation slot through a circulation pump for continuous use. Meanwhile, the liquid level in the exfoliation slot can be controlled to approximately the set value. The graphene oxide is filtered to form a concentrated slurry, which is washed and dried to obtain a graphene oxide powder material. In order to achieve continuous production, belt filtering can be used.

The advantages and beneficial effects of the present invention are as follows:

1. The high-purity graphene oxide product can be prepared without using a strong oxidizing agent and introducing metal impurity ions in the preparation process of the present invention.

2. The graphene yield of the invention is greater than 90%, the obtained graphene monolayer rate can reach 50% or above, while the oxidation degree of the graphene oxide can be controlled.

3. The invention can realize continuous and automatic preparation of graphene oxide, and the thickness of the graphene oxide nanoplatelet is within the range of 0.5 to 5 nm.

4. The main reactant consumed in the reaction process of the present invention is water, and the other reactants can be recycled. Therefore, pollutant emission is low and therefore the present invention can effectively reduce environmental pollution in the preparation process of graphene oxide.

DETAILED DESCRIPTION OF THE PREFERRED EMBODIMENT

Figure 1:
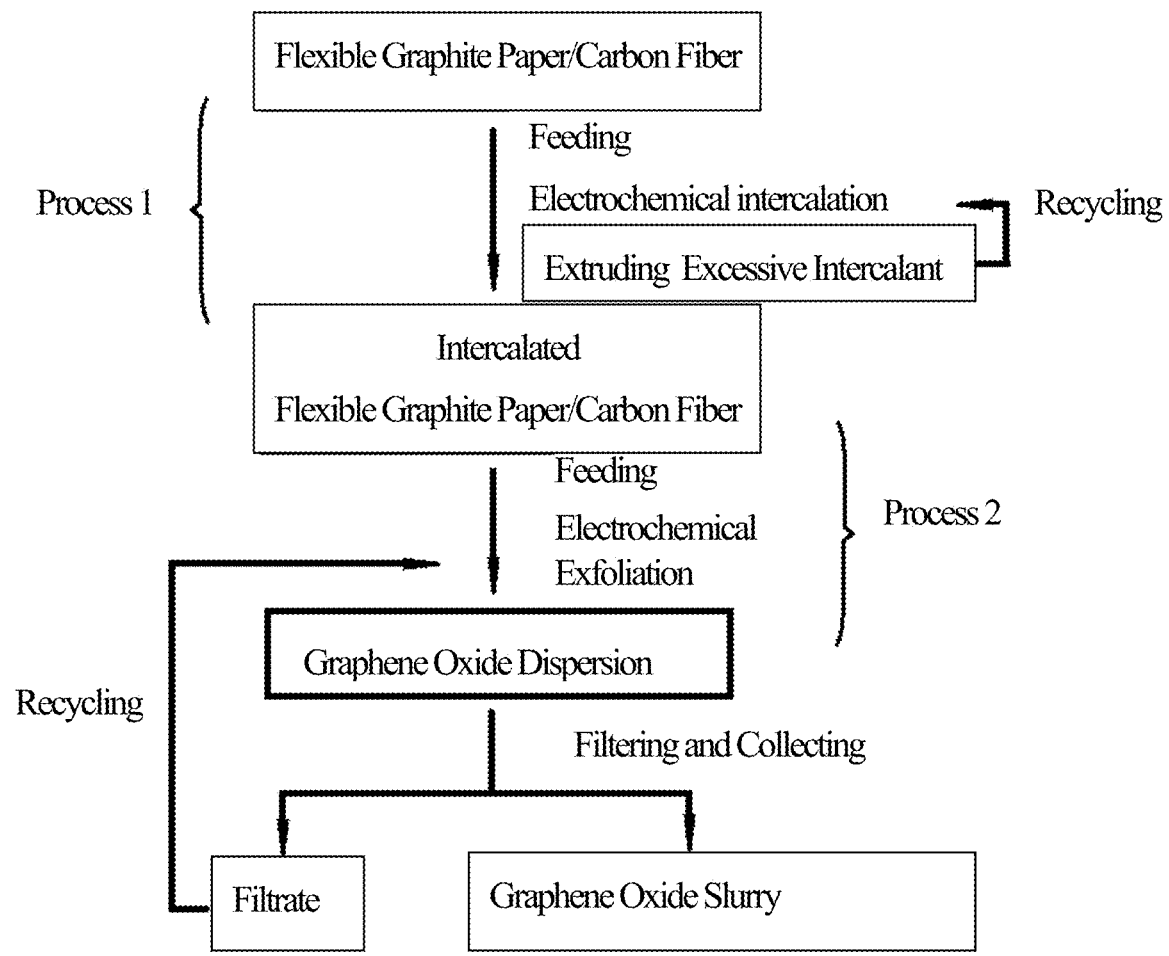
FIG. 1 is a block diagram illustration of a method of continuously preparing graphene oxide by using graphite paper or carbon fiber.
Figure 2:
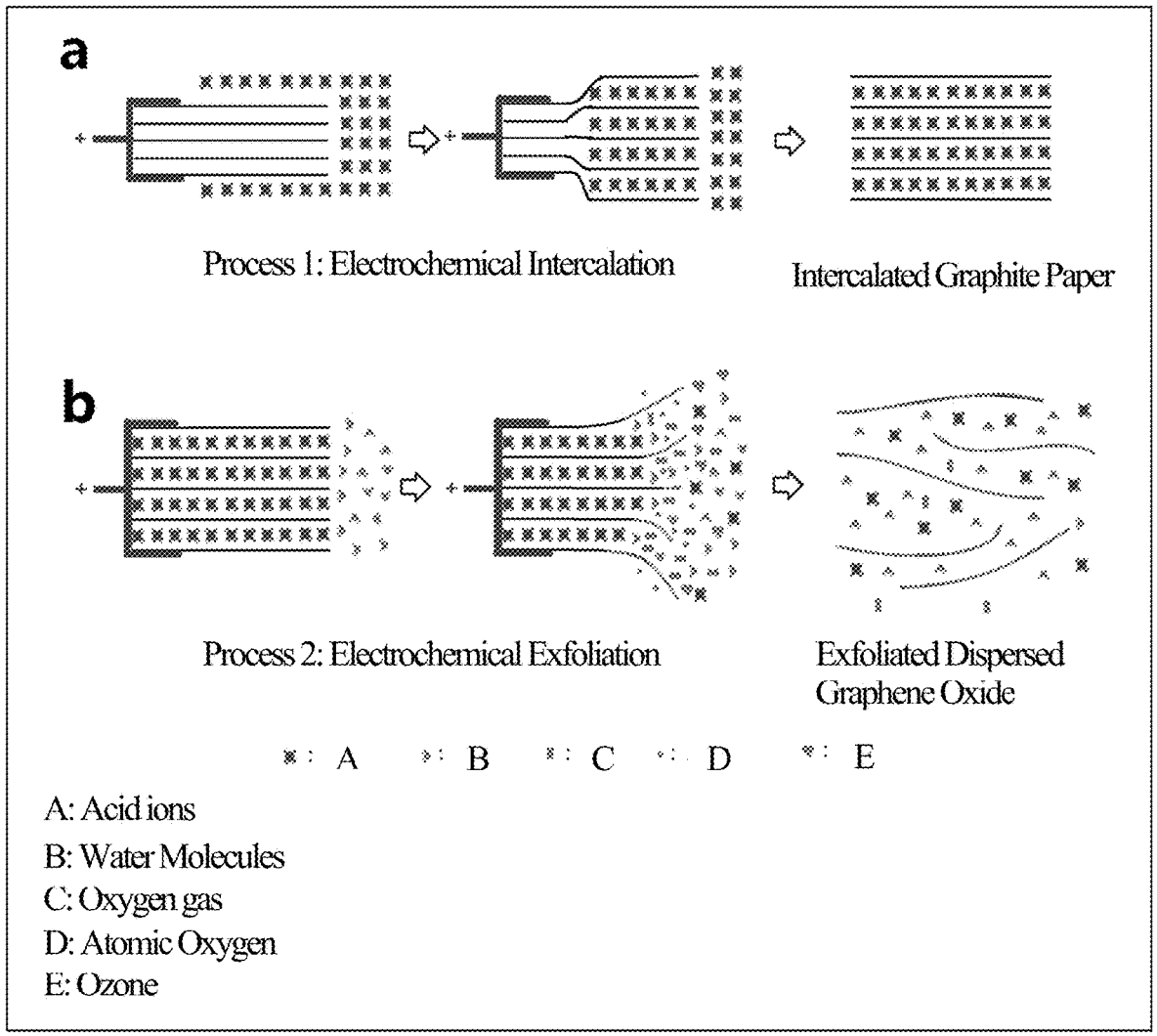
FIG. 2 is a schematic diagram showing the mechanism of electrochemical intercalation and electrolytic oxidation exfoliation, wherein (a) is the first process (electrochemical intercalation layer); and (b) is the second process (electrolytic oxidation exfoliation layer).

According to the preferred embodiment of the present invention, the graphite raw material used in the invention is a flexible graphite coil material, a strip material or a carbon fiber wire material which is industrially produced, and is a mature industrial product. Wherein the flexible graphite is also known as flexible graphite paper or flexible graphite sheet and is prepared from natural graphite flakes, which is processed by chemical treatment, heated to form a graphite worm by high temperature expansion, and then rolled to form a flexible graphite coil material. Flexible graphite coil materials do not contain binders and fillers, and are therefore have high purity. The nature and characteristics of its products can refer to national industry standards: JB/T 7758.2-2005 'Technical Conditions for Flexible Graphite Sheets', JB/T 53392-1999 'Quality Classification of Flexible Graphite Sheets'; JB/T 6613-2008 'Flexible Graphite Sheet, band, classification, code and label'. Carbon fiber is a new fiber material which has a carbon content more than 95% by weight and has high strength and high modulus features. It is a flexible continuous microcrystalline graphite material obtained by carbonizing and graphitizing polypropylene fiber or asphalt fiber. The microstructure is composed of stacks of graphite crystallite flakes along the axial direction of the fiber. The product properties and characteristics can be referred to the national standard: GB/T 26752-2011 "Polyacrylonitrile-based carbon fiber".

The present invention uses a flexible and continuous graphite coil material, strip material or carbon fiber wire material as the raw material. Driven by a feeding device, sequentially processing a two-step treatment of electrochemical intercalation and electrolytic oxidation exfoliation respectively so that the graphite material is exfoliated to graphene oxide nanoplatelet. Electrochemical intercalation is carried out in concentrated acid such as concentrated sulfuric acid, concentrated nitric acid and chlorosulfonic acid. The graphite material is used as the anode and the inert electrode is used as the cathode. When energized under immersion conditions, acid molecules or acid ions are driven by the electric field to enter the graphite layer to form intercalated graphite continuous material of first-order or low-order intercalation. Electrolytic exfoliation is performed by using the intercalated graphite continuous material as an anode, an inert electrode as a cathode, then connecting power to carry out electrolytic exfoliation in an aqueous electrolyte solution so that oxygen produced between layers by electrolysis is used for oxidation exfoliation of the intercalated graphite to obtain the graphene oxide. The method for preparing graphene oxide does not contain metal impurities, and has the advantages of controllable oxidation degree of graphene, process being continuous and automated, high safety and low emissions.

The present invention is described in further detail below with reference to specific embodiments, which is for illustration only and is not intended to be limiting.

Embodiment 1

Figure 3:
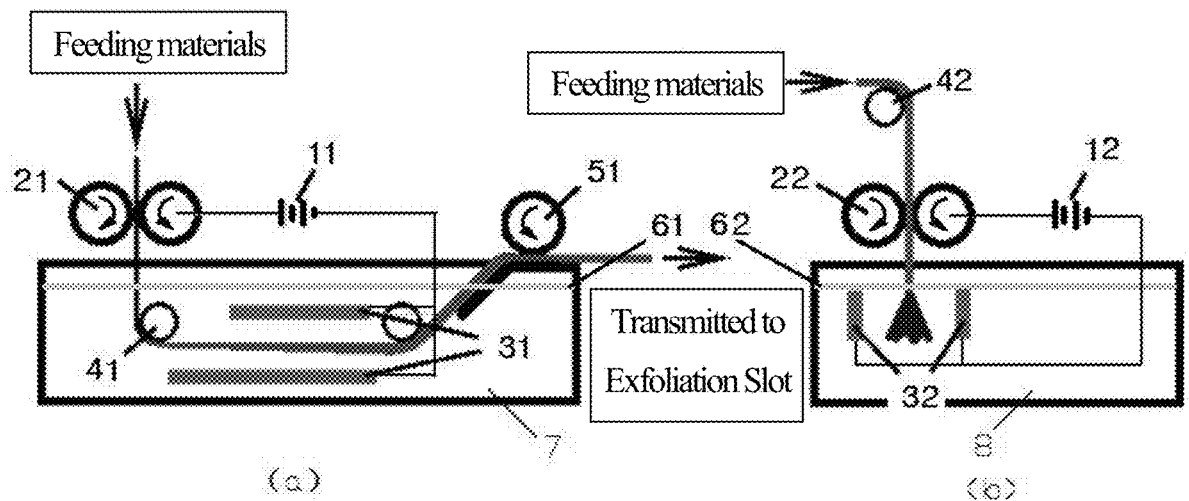
FIG. 3 is a schematic diagram showing the process and structure of the device employed in the preferred embodiment 1 of the present invention, wherein (a) is the electrochemical intercalation layer; (b) is the electrolytic oxidation exfoliation layer; in (a), 11 refers to voltage regulated DC power supply I; 21 refers to shaft roller type feeding device I; 31 refers to inert electrode I; 41 refers to acid-resistant guide roller I; 51 refers to acid-discharging roller I; 61 refers to liquid surface of electrolytic slot I; 7 refers to intercalation slot. Wherein in (b), 12 refers to voltage regulated DC power supply II; 22 refers to shaft roller type feeding device II; 32 refers to inert electrode II; 42 refers to acid-resistant guide roller II; 62 refers to liquid surface of electrolytic slot II; 8 refers to expanded exfoliation slot.

The flexible graphite paper coil having a carbon content of 99.5 wt % and a volume conductivity of 500 S/cm is used as a raw material for preparing graphene oxide. Referring to FIG. 3(*a*) and FIG. 3(*b*) of the drawings, a schematic diagram of the structure of a continuous preparation apparatus used in process 1 (electrochemical intercalation) and process 2 (electrolytic oxidation exfoliation) of the present invention is illustrated. Wherein, as shown in FIG. 3(*a*) of the drawings, an electrochemical intercalation device mainly comprises: a regulated DC power supply I 11, a shaft roller type feeding device I 21, an inert electrode I 31, an acid-resistant guide roller I 41, an acid-discharging roller I 51, a liquid surface of electrolytic slot I 61, and an intercalation slot 7. The specific structure is as follows: the inert electrode I 31 and the acid-resistant guide roller I 41 are disposed below the liquid surface of electrolytic slot I 61 of the intercalation slot 7. The inert electrodes I 31 are disposed horizontally at an upper side and a lower side. The acid-resistant guide rollers I 41 are disposed on two lateral sides of the inert electrodes I 31 respectively. The shaft roller type feeding device I 21 and the acid discharging roller I 51 are disposed above the intercalation slot 7. The positive electrode of the voltage regulated DC power supply I 11 is electrically connected with the shaft roller type feeding device I 21. The negative electrode of the voltage regulated DC power supply I 11 is electrically connected with the inert electrode I 31. The feed materials (graphite roll materials) sequentially passes through the shaft roller type feeding device I 21, the acid-resistant guide roller I 41, the inert electrode I 31, the acid-resistant guide roller I 41 and the acid-discharging roller I 51.

The positive electrode of the voltage regulated DC power supply I 11 is connected to the graphite coil materials through a conductive surface of the shaft roller type feeding device I 21 so that the graphite coil materials is positively charged. The negative electrode of the voltage regulated DC power supply I 11 is connected to the inert electrode I 31 disposed in the intercalation slot 7. The graphite coil material is driven by the shaft roller type feeding device I 21 to immerse under the liquid surface of electrolytic slot I 61 in the intercalation slot 7, pass through the acid-resistant guide roller I 41 to change direction and to enter horizontally to the intercalation region of the inert electrode I 31, form a loop conduction with the electrolyte in the intercalation layer (intercalant). The intercalation substances are driven by the electric field and are gradually inserted inside the graphite coil materials to form an intercalated graphite coil materials. By controlling the feeding speed, it is possible to control the maintaining time (duration of staying time) of the graphite coil materials in the intercalation region. During the maintaining time, the graphite coil material complete intercalation during movement. Then, the graphite coil material passes through the acid-resistant guide roller I 41 to change direction and is gradually pulled out of the intercalation slot 7. The excess intercalant adsorbed on the surface of the graphite coil materials is extruded by the acid-discharging roller I 51 and then flows back into the intercalation slot. After passing through the acid-discharging roller I 51, the intercalated graphite coil materials is transported to the expanded exfoliation slot 8 for subsequent treatment.

Referring to FIG. 3(b) of the drawings, the electrolytic oxidation exfoliation device mainly comprises: a voltage regulated DC power supply II 12; a shaft roller type feeding device II 22; inert electrode II 32; acid-resistant guide roller II 42; liquid surface of electrolytic slot II 62; and expanded exfoliation slot 8. The specific structure is as follows: the inert electrode II 32 is disposed below the liquid surface of electrolytic slot II 62 of the expanded exfoliation slot 8. The inert electrodes II 32 are disposed vertically at a left side and a right side respectively. The shaft roller type feeding device II 22 and the acid-resistant guide roller II 42 are disposed above expanded exfoliation slot 8. The positive electrode of the voltage regulated DC power supply II 12 is electrically connected to the shaft roller type feeding device II 22. The negative electrode of the voltage regulated DC power supply II 12 is electrically connected to the inert electrode II 32. The feed material (the intercalated graphite coil material) pass through the acid-resistant guide roller II 42 and the shaft roller type feeding device II 22 to extend between the inert electrodes II 32.

In the expanded exfoliation slot 8, the connection method of the voltage regulated DC power supply II 12 is similar to that of the intercalation slot 7 except that the position of the inert electrodes II 32 is perpendicular to the liquid surface of electrolytic slot II 62 and is parallel to the feed direction of the intercalated graphite coil materials with an axis of the inert electrode as the center. The intercalated graphite coil material is driven by the shaft roller type feeding device II 22, passes through the acid-resistant guide roller II 42 to change direction, then vertically immerses below the liquid surface of electrolytic slot II 62 which contains exfoliation electrolyte, and is connected with the exfoliation electrolyte and the inert electrode II 32 to form a loop. The intercalated graphite coil material is immersed in the liquid surface below the liquid surface of electrolytic slot II 62 and expansion and exfoliation are occurred under the action of electrolysis. Then a graphene oxide nanoplatelet is formed and gradually dispersed in the solution of the exfoliation slot so that the intercalated graphite coil material is depleted. By controlling the feeding rate, the consumption rate of the intercalated graphite coil material and the feed replenishment rate is balanced, thereby realizing a continuous manufacturing process.

In the above first process, the intercalant in the intercalation slot is concentrated sulfuric acid having a concentration of 98 wt %, the intercalation voltage is 60 V; the maintaining time of the graphite material in the intercalation electrode region is 20 seconds, and the transmission speed of the feeding device is 15 cm/min; the length of the intercalation electrode area is 5 cm, the inert electrodes are made of stainless steel and positioned on two sides of the graphite material while leveled with the surface of the graphite material; the distance between the inert electrode and one side of the surface of the graphite material is 10 mm.

In the above second process, the electrolyte used for electrochemical oxidation exfoliation is a 1 Mol/L aqueous solution of sulfuric acid with a conductivity of 180 mS/cm, the voltage used for electrochemical oxidation exfoliation is 50V. The feeding rate of the intercalated graphite continuous material into the solution is 2 cm/min. Centered on the graphite material, the inert electrode material is platinum placed on two sides of the graphite material while leveled with the surface of the graphite material, the distance between the platinum electrode and the surface of the graphite material is 10 mm.

Figure 4:
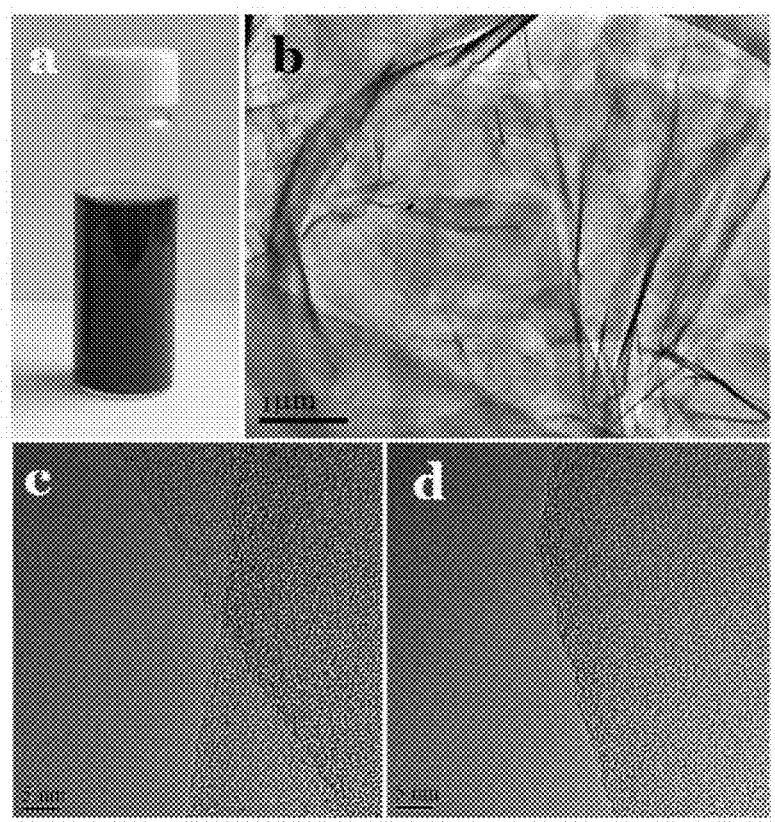
FIG. 4 is photos of the graphene oxide in dispersed state obtained by the method of embodiment 1 (a) and the graphene oxide nanoplatelet under typical high resolution transmission electron microscopy (b-d).
Figure 5:
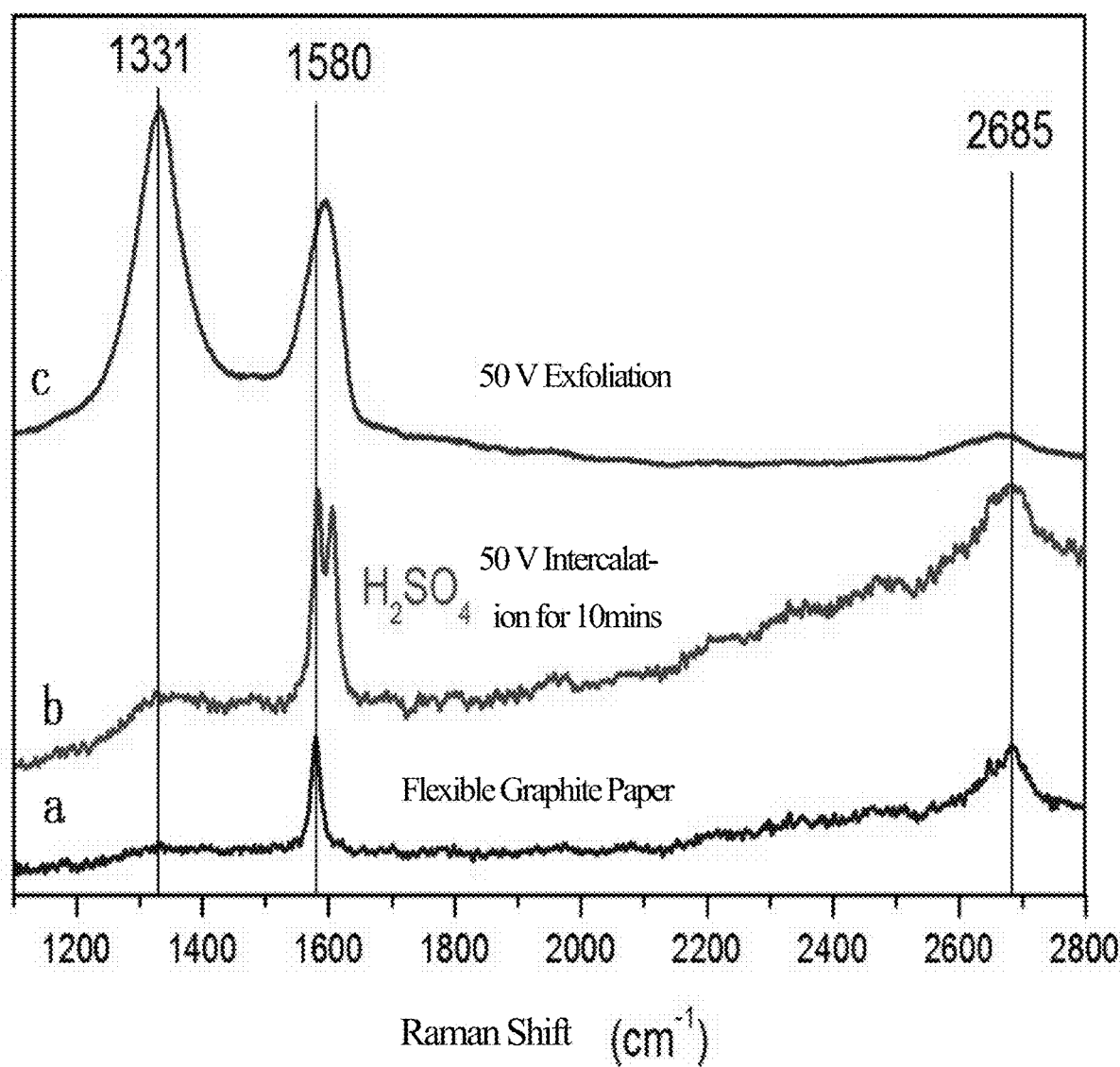
FIG. 5 illustrates the comparison of Raman spectra of graphite paper (a), intercalated graphite paper (b) and graphene oxide (c) prepared by exfoliation at different voltages.

The morphology of the graphene oxide solution prepared by using the above device, process and parameters is as shown in FIG. 4a of the drawings. The aqueous graphene oxide dispersion exhibits a uniform dark brown color. Its low-power transmission electron microscope morphology is shown in FIG. 4b of the drawings. The Characteristics shown by the high resolution transmission electron microscopy (FIG. 4c, d) show that it mainly consists of a single layer of graphene oxide nanoplatelet. This batch sample is collected, washed, and dried and the calculated yield rate is 97 wt % by weight. According to transmission electron microscopy statistics, the single layer rate was 75%. The carbon to oxygen ratio of this batch is tested by combustion method and the result is 1.8:1. The results of the laser Raman spectroscopy test of the sample in this batch are shown in FIG. 5c, which shows a typical graphene oxide state.

Embodiment 2

The carbon fiber continuous wire having a carbon content of 99.8 wt % and a volume conductivity of 850 S/cm is used as a raw material for preparing graphene oxide. The process and device structure are similar to that of Embodiment 1 and the specific production parameters are as follows:

In the above first process, the intercalant in the intercalation slot is concentrated nitric acid having a concentration of 99 wt %, the intercalation voltage is 80 V; the maintaining time of the graphite material in the intercalation electrode region is 10 seconds, and the transmission speed of the feeding device is 30 cm/min. The length of the intercalation electrode area is 5 cm, the inert electrodes are made of graphite and positioned on the upper side and the lower side of the graphite material while leveled with the surface of the graphite material; the distance between the inert electrode and one side of the surface of the graphite material is 15 mm.

In the above second process, the electrolyte used for electrochemical oxidation exfoliation is an aqueous solution of sodium nitrate having a concentration of 0.8 Mol/L, the conductivity of the solution was 77 mS/cm, the voltage used for electrochemical oxidation exfoliation is 70V. The feeding rate of the intercalated graphite continuous material into the solution is 5 cm/min. Centered on the graphite material, the inert electrode material is graphite and surrounded the carbon fiber materials by using the centerline of the carbon fiber as the center. The distance between the graphite electrode and the centerline of the carbon fiber is 15 mm.

The graphene oxide solution prepared by the above devices, processes and parameters and its morphology under transmission electron microscope are similar to those of the embodiment 1. This batch sample is collected, washed, and dried and the calculated yield rate is 105 wt % by weight. According to transmission electron microscopy statistics, the single layer rate was 77%. The carbon to oxygen ratio of this batch is tested by combustion method and the result is 1.05:1. The result shows a typical graphene oxide state.

Embodiment 3

The flexible graphite paper coil having a carbon content of 98 wt % and a volume conductivity of 550 S/cm is used as a raw material for preparing graphene oxide. The process and device structure are similar to that of Embodiment 1 and the specific production parameters are as follows:

In the above first process, the intercalant in the intercalation slot is chlorosulfonic acid having a concentration of 100 wt %, the intercalation voltage is 60 V; the maintaining time of the graphite material in the intercalation electrode region is 30 seconds, and the transmission speed of the feeding device is 10 cm/min; the length of the intercalation electrode area is 5 cm, the inert electrodes are made of platinum and positioned on an upper side and a lower side of the graphite material while leveled with the surface of the graphite material; the distance between the inert electrode and one side of the surface of the graphite material is 5 mm.

In the above second process, the electrolyte used for electrochemical oxidation exfoliation is a 1 Mol/L aqueous solution of sodium chloride with a conductivity of 145 mS/cm, the voltage used for electrochemical oxidation exfoliation is 20V. The feeding rate of the intercalated graphite continuous material into the solution is 1 cm/min. Centered at the graphite material, the inert electrode material is platinum and surrounded the graphite material by using the centerline of the graphite material as the center, the distance between the graphite electrode and the centerline of the graphite paper is 30 mm.

The graphene oxide solution prepared by the above devices, processes and parameters and its morphology under transmission electron microscope are similar to those of the embodiment 1. This batch sample is collected, washed, and dried and the calculated yield rate is 95 wt % by weight. According to transmission electron microscopy statistics, the single layer rate was 55%. The carbon to oxygen ratio of this batch is tested by combustion method and the result is 2.5:1. The result shows a typical graphene oxide state.

The above results show that the preparation process of the graphene oxide of the present invention is simple and easy to control, is capable of realizing continuous production, has high yield of graphene oxide, high single-layer rate, and does not require the introduction of any metal impurities, thereby having a great application value.

What is claimed is:

1. A method of continuously preparing graphene oxide nanoplatelet, characterized in that: the method comprises the steps of:

providing a graphite raw material selected from the group consisting of flexible graphite paper coil material, flexible graphite strip material and carbon fiber wire material;

through driving the graphite raw material by a feeding device, sequentially processing a two-step treatment of electrochemical intercalation and electrolytic oxidation exfoliation respectively;

obtaining a graphene oxide nanoplatelet which is dispersed in electrolyte; and processing treatment of filtering, washing and drying and then obtaining a graphene oxide powder material.

2. The method of continuously preparing graphene oxide nanoplatelet according to claim 1, characterized in that, the treatment of electrochemical intercalation comprises a first process of electrochemical intercalation carried out in a first device, and the treatment of electrolytic oxidation exfoliation comprises a second process of electrochemical electrolysis for oxidation and exfoliation carried out in a second device; the graphite raw material is used as an anode and an inert electrode material is used as a cathode to conduct electrochemical reactions in both of the first device and the second device, and the graphene oxide nanoplatelet is formed in the second device.

3. The method of continuously preparing graphene oxide nanoplatelet according to claim 2, characterized in that, wherein in the first process of electrochemical intercalation, an intercalant is one or a mixture of two or more selected from the group consisting of concentrated sulfuric acid, concentrated nitric acid, chlorosulfonic acid and concentrated phosphoric acid in the liquid phase, and the intercalant has a total water content not higher than 2 wt %; after the process of electrochemical intercalation, a first product is formed and the first product has a shape unchanged and remains in a continuous state while a mechanical and electrical properties are not degraded.

4. The method of continuously preparing graphene oxide nanoplatelet according to claim 2, characterized in that, wherein in the first process of electrochemical intercalation, a voltage range of 10~1000 V is used, the graphite material has a maintaining time range of 1~200 seconds in an intercalated electrode area, the feeding device has a transmission speed which is designed or adjusted based on a length of the intercalated electrode area and a duration of the maintaining time, the length of the intercalation electrode area is designed according to a length of an intercalation slot, and a ratio of the length of the intercalation electrode area to the length of the intercalation slot is 1:6-2:3; a feed rate of the graphite material ranges from 1 mm/min to 10 m/min; the graphite material defined a center, the inert electrode is placed on one or two side of the graphite material and is level with a surface of the graphite surface; a distance between the inert electrode and the surface of the graphite material ranges from 1 mm to 1 m.

5. The method of continuously preparing graphene oxide nanoplatelet according to claim 2, characterized in that, wherein in the second process of electrochemical electrolysis for oxidation and exfoliation, the electrolyte used is an aqueous solution of strong electrolyte acids, bases or salts, which includes but not limited to one or a mixture of two of the group selecting from sulfuric acid, nitric acid, hydrochloric acid, sodium sulfate, potassium sulfate, sodium chloride and amine nitrate, the electrolyte is a solution having a solution conductivity ranged from 100 µS/cm to 1000 S/cm.

6. The method of continuously preparing graphene oxide nanoplatelet according to claim 2, characterized in that, wherein in the second process of electrochemical electrolysis for oxidation and exfoliation, a voltage range of 10~1000 V is used; the intercalated graphite continuous material obtained after the first process is driven by the feeding device to gradually introduce into a region below a surface of the electrolyte solution, and to oxidize and exfoliate to form the graphene oxide nanoplatelet in the region, then the graphene oxide nanoplatelet is peeled off from the intercalated graphite continuous material and dispersed into the electrolyte; a feed rate of the intercalated graphite continuous material into the electrolyte solution ranges from 1 mm/min to 10 m/min; the intercalated graphite continuous material defined a center, the inert electrode is placed on one or two side of the intercalated graphite continuous material and is level with a surface of the intercalated graphite continuous material; alternately, a centerline of the intercalated graphite continuous material defined a center, the inert electrode is surrounding the intercalated graphite continuous material; a distance between the inert electrode and the surface of the intercalated graphite continuous material ranges from 1 mm to 1 m.

7. The method of continuously preparing graphene oxide nanoplatelet according to claim 1, characterized in that, an oxidation degree of the graphene oxide nanoplatelet which is exfoliated and dispersed in the electrolyte has a corresponding relation with the voltage used in the electrolysis process, if the voltage increases, the oxidation degree of the graphene oxide nanoplatelet increases, the product has a carbon to oxygen ratio ranging from 1:1 to 10:1.

8. The method of continuously preparing graphene oxide nanoplatelet according to claim 2, characterized in that, a yield-to-weight ratio of graphene to graphite raw material is greater than 90%, and a weight ratio of single-layer rate of the graphene oxide product is greater than 50%.

9. The method of continuously preparing graphene oxide nanoplatelet according to claim 2, characterized in that, in the first process, as an amount of graphite increases, an amount of the intercalant in the reaction tank is gradually reduced, and additional intercalant is added to the intercalation slot to maintain a solution level in the reaction tank so that the solution level of the intercalant is maintained within a range of ±2 mm compared to an initial level; in the second process, the graphene oxide dispersed in the liquid phase in the exfoliation slot is collected by filtration, then the filtrate is pumped back into the exfoliation slot for continuous use, and pure water is added to adjust the conductivity of the solution.

10. The method of continuously preparing graphene oxide nanoplatelet according to claim 6, characterized in that, an oxidation degree of the graphene oxide nanoplatelet which is exfoliated and dispersed in the electrolyte has a corresponding relation with the voltage used in the electrolysis process, if the voltage increases, the oxidation degree of the graphene oxide nanoplatelet increases, the product has a carbon to oxygen ratio ranging from 1:1 to 10:1.

11. The method of continuously preparing graphene oxide nanoplatelet according to claim 5, characterized in that, in the first process, as an amount of graphite increases, an amount of the intercalant in the reaction tank is gradually reduced, and additional intercalant is added to the intercalation slot to maintain a solution level in the reaction tank so that the solution level of the intercalant is maintained within a range of ±2 mm compared to an initial level; in the second process, the graphene oxide dispersed in the liquid phase in the exfoliation slot is collected by filtration, then the filtrate is pumped back into the exfoliation slot for continuous use, and pure water is added to adjust the conductivity of the solution.

12. The method of continuously preparing graphene oxide nanoplatelet according to claim 6, characterized in that, in the first process, as an amount of graphite increases, an amount of the intercalant in the reaction tank is gradually reduced, and additional intercalant is added to the intercalation slot to maintain a solution level in the reaction tank so that the solution level of the intercalant is maintained within a range of ±2 mm compared to an initial level; in the second process, the graphene oxide dispersed in the liquid phase in the exfoliation slot is collected by filtration, then the filtrate is pumped back into the exfoliation slot for continuous use, and pure water is added to adjust the conductivity of the solution.

* * * * *